C. H. NORDELL.
AERATING APPARATUS.
APPLICATION FILED MAR. 23, 1916.
1,208,821. Patented Dec. 19, 1916.
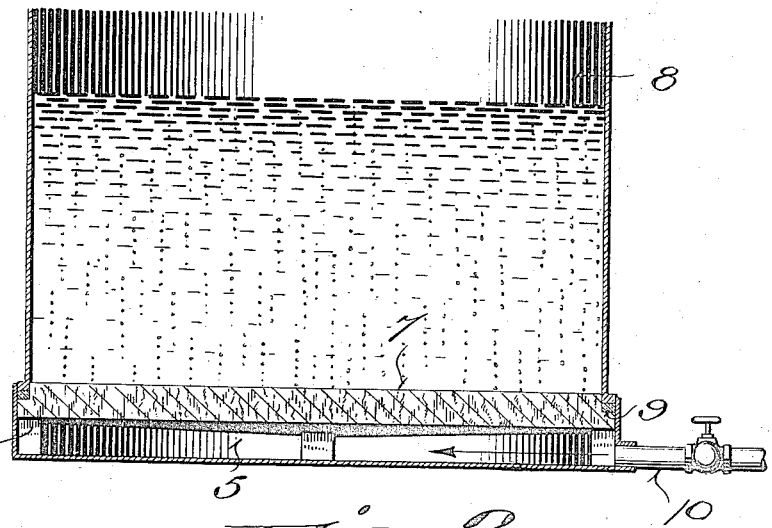
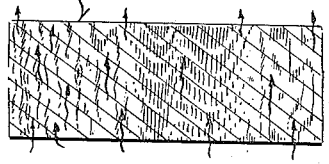
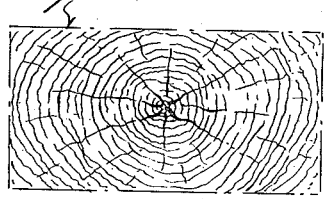

UNITED STATES PATENT OFFICE.

CARL H. NORDELL, OF MILWAUKEE, WISCONSIN.

AERATING APPARATUS.

1,208,821. Specification of Letters Patent. Patented Dec. 19, 1916.

Application filed March 23, 1916. Serial No. 86,174.

*To all whom it may concern:*

Be it known that I, CARL H. NORDELL, a citizen of the United States, and resident of Milwaukee, in the county of Milwaukee and State of Wisconsin, have invented certain new and useful Improvements in Aerating Appaartus; and I do hereby declare that the following is a full, clear, and exact description thereof.

The present invention relates to new and useful improvements in apparatus for introducing relatively fine air or gas bubbles in the body of a liquid, one important application of the present invention being in the aeration of sewage although the features herein involved may be equally applicable to any desired operation of aerating liquids or of introducing any gases thereinto to be dissolved thereby, in this connection a further instance of use being the operation of carbonating beverage fluids.

Heretofore the operation of introducing bubbles into a fluid has been procured by forcing the air or other gas through minute perforations in flat metallic plates or pipes, or through a body of porous natural or artificial stone.

In connection with the use of pipes or plates of metal, it has been found impractical to provide perforations therein of such small size as to procure a desired efficiency of operation. The use of fine pored stone is attended with various disadvantages in view of the tortuous nature of the passages therein, and of the capillary action of the fluid in the passages, whereby relatively great resistance is offered to the passage of the air or gas and consequently whereby an exceedingly great pressure must be employed. In practical applications it has been found that a pressure of substantially forty pounds to the square inch must be exerted on the gas to force it through stone having such relative fineness of pores as to procure bubbles of a certain desired minute size.

It is a desired feature to provide a diffusing body provided with a great number of relatively fine openings to produce consequent minute bubbles, inasmuch as the amount of the liquid surface exposed to action of the air or gas increased directly in proportion to the fineness of the subdivision of the bubbles. Also it has been determined that when the bubbles are of less than a certain critical size their speed of ascent through the liquid decreases in direct inverse proportion to their diameter and consequently bubbles of a relatively minute size would be retained in a given depth of liquid for a greater length of time, to permit the absorption of a greater proportion of their volume in the liquid.

In view of all the foregoing it is the object of the present invention to provide a porous diffusing body provided with apertures of sufficient fineness to produce bubbles of very small size and offering a relatively slight resistance to passage of air therethrough and a relatively great resistance to passage of water therethrough whereby air or other gas may be operatively forced through the body at a minimum pressure.

I have discovered that the use of a plate of wood cut transversely across the grain procures a diffusing body unaccompanied by the disadvantages incident to the use of stone or other bodies heretofore employed, and the provision of a wood or other fibrous diffusing body having its fibers extending transversely of the body to define air channels is the essential feature of my invention.

In the drawings: Figure 1 is a vertical sectional view through an aerating apparatus including a diffusing body of wood in accordance with my present invention. Fig. 2 is an enlarged transverse sectional view through a portion of the diffusing body. Fig. 3 is a plan view of a section of the diffusing body.

Referring now more particularly to the accompanying drawings, 5 designates a pan shaped casing member provided at its edge portion with spacing blocks 6 on which seat the diffusing body 7 which comprises a plate or slab of wood having its top and bottom faces cut transversely of the grain whereby the passages defined by the fibers of the wood extend substantially in a vertical direction. A suitable tank or other container 8 is disposed over the body and a joint 9 of any desired construction is provided at its bottom edge in connection with the wall of the pan member whereby an air and water tight joint is procured. A water chamber is thus provided over the diffusing slab and an air chamber provided under the diffusing slab and communicating with this last chamber is an air pipe 10 for supplying air to the chamber under pressure. It is understood that the improved diffusing slab may be employed, however, with any type of apparatus through which air or gas is forced into a fluid. In operation, the air passes through the diffusing body 7 and emerges into the fluid in finely divided bubbles.

Referring to Figs. 2 and 3 it is seen that the air forces its way through the wood between the fibers thereof, and although a somewhat tortuous path may be thus entailed, the path of movement is in a general direction vertical in contradistinction to the devious path of movement of gas through a stone or similar porous body.

Although any type of wood or fibrous body may be employed, I find that basswood gives entirely satisfactory results, and I have found that the pressure resistance of a slab of basswood one half inch thick varies from one-fourth a pound to one pound to the square inch in accordance with the amount of gas passing therethrough, in contradistinction to the heretofore mentioned pressure resistance of stone having pores of such relative fineness as to procure bubbles of a size favorably comparable to the bubbles procured by the use of my wooden diffusing body.

I claim:

A container for sludge having a bottom composed of wooden slabs cut transversely of the grain to form minute elastic passages for air, a casing below the wood slab bottom forming an air chamber, and means for introducing air under pressure into the chamber whereby it is forced through the fibrous passages of the wood slabs to form minute bubbles for uniformly aerating the body of the sludge that is supported by the fibrous bottom.

In testimony that I claim the foregoing I have hereunto set my hand at Milwaukee, in the county of Milwaukee and State of Wisconsin, in the presence of two witnesses.

CARL H. NORDELL.

Witnesses:
   FRANK S. RATCLIFFE,
   M. E. DOWNEY.